United States Patent

[11] 3,530,868

[72] Inventor Michael A. Rickards
 Sherman Oaks, California
[21] Appl. No. 751,826
[22] Filed Aug. 12, 1968
[45] Patented Sept. 29, 1970
[73] Assignee Walter Kidde & Company, Inc.,
 Belleville, New Jersey
 a corporation of New York

[54] DYNAMIC PRESSURE SENSITIVE SELECTOR
 25 Claims, 6 Drawing Figs.
[52] U.S. Cl. .................................................. 137/38,
 137/39, 137/116, 137/467, 244/122
[51] Int. Cl. ........................................... H01m 35/04
[50] Field of Search .................................. 137/38, 39,
 115, 116, 116.3, 116.5, 117, 458, 467;
 244/122.15, 122.19 (Inquired); 128/1

[56] References Cited
UNITED STATES PATENTS
| | | | |
|---|---|---|---|
| 3,105,506 | 10/1963 | Beeby............................ | 137/38 |
| 3,146,720 | 9/1964 | Henry............................ | 137/117X |
| 3,199,523 | 8/1965 | McEathron.................... | 137/467X |
| 3,249,145 | 5/1966 | Alberani........................ | 137/38X |

*Primary Examiner* — Clarence R. Gordon
*Attorney* — Lyon and Lyon

ABSTRACT: A pressure sensitive device that responds to dynamic air pressure to select either one of two sequences best suited for the dynamic air pressure level experienced. A modification of the device used in the system compensates for inertial and gravitational forces, which might interfere in the selection of the proper sequence.

Patented Sept. 29, 1970

INVENTOR.
MICHAEL A. RICKARDS
BY Lyon & Lyon
ATTORNEYS

Patented Sept. 29, 1970
3,530,868
Sheet 2 of 2
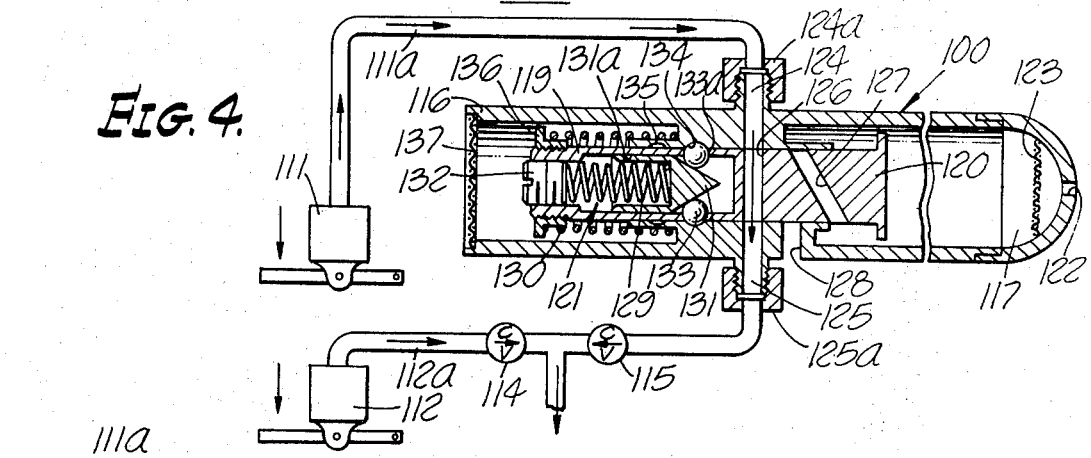
FIG. 4.
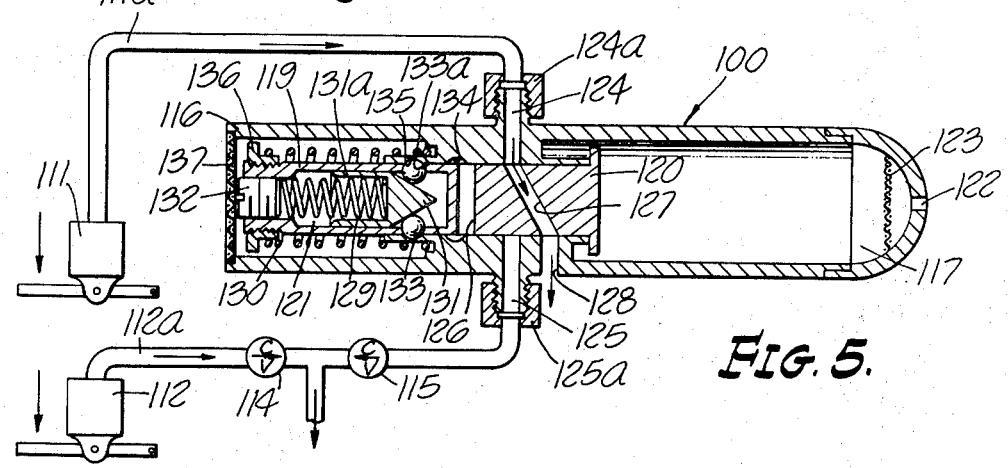
FIG. 5.
FIG. 6.
INVENTOR
MICHAEL A. RICKARDS
BY
Lyon & Lyon
ATTORNEYS.

DYNAMIC PRESSURE SENSITIVE SELECTOR

This invention relates to an air pressure responsive selector and is particularly directed to improvements in selecting a sequence in accordance with a particular level of dynamic air pressure.

This device is described in connection with the selection of the time interval between ejection and parachute deployment in an aircraft escape system, but the device might be used in a variety of systems to select one sequence over another according to the level of air pressure sensed. The device could initiate the opening of one hatch and not another, position a lever in one of two positions, release one of two packages, etc.

The typical escape system sequence consists of ejecting the man, seat and parachute in one assembly from the aircraft by the use of rockets. After a selected time delay the seat and man are separated and following another selected time delay, the parachute is inflated for the subsequent recovery descent.

The advent of high speed aircraft with vertical take-off and landing characteristics has created new problems for the field of aircraft escape systems. New systems must be developed to meet the escape requirements demanded by a high sink rate, low aircraft velocity escape and a high aircraft velocity escape.

High sink rate, low velocity escape conditions require a short time delay from ejection to parachute inflation in order to insure ample terminal recovery distance prior to ground contact. On the other hand, high velocity escape conditions demand a relatively longer time delay in order to insure a proper reduction in dynamic pressure prior to parachute inflation to prevent excessive opening shock and canopy loading on the chute.

Within the limits of the present escape systems of 0 to 600 knot aircraft velocity at ejection, this device will select the required time delays that will enable the current escape systems to meet the more severe requirements imposed by high speed aircraft with vertical take-off and landing.

Briefly stated, the device of the invention consists of a pressure plate and a plunger both mounted for axial movement within a housing. The housing receives air which causes air pressure to act on the pressure plate and effect movement of the plunger when the air pressure exceeds a preselected level. The movement of the plunger determines which sequence will be selected.

It is an object of this invention to provide an apparatus which selects one sequence over another sequence according to the level of air pressure sensed.

A further object is to provide an apparatus which reacts only to initial air pressure sensed and performs satisfactorily irregardless of subsequent air pressure conditions.

Another object of this invention is to provide an apparatus which resists tampering that might cause a premature or improper selection.

Also it is an object of this invention to provide an apparatus having a negligible sensing time, i.e., the time between introduction to the airstream and selection.

It is also an object of this invention to provide an apparatus which is not adversely affected by air momentum forces known as "airblast".

Another object is to provide an apparatus which is immune to ejection and gravitational forces.

Other objects and advantages will appear from the following description and the accompanying drawings.

In the drawings:

FIG. 4 is a sectional side view showing a modified form of the device in an overpressure condition.

FIG. 5 is a sectional side view showing the modified form of FIG. 4 in an underpressure condition.

FIG. 6 is a sectional side view showing a further modified form.

Figure 2:
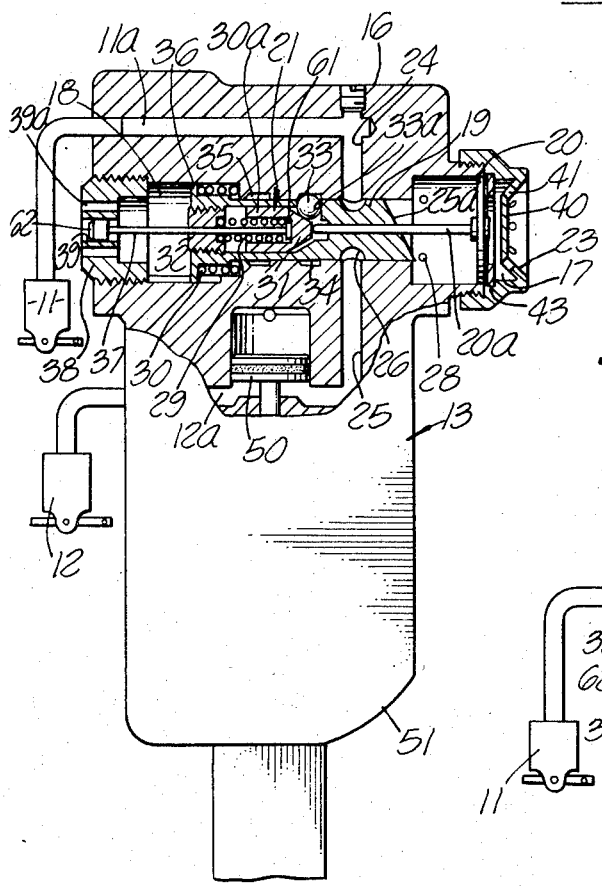
FIG. 2 is a sectional side view showing the device in an underpressure condition in connection with the firing assembly for a parachute deployment gun in an aircraft escape system.
Figure 3:
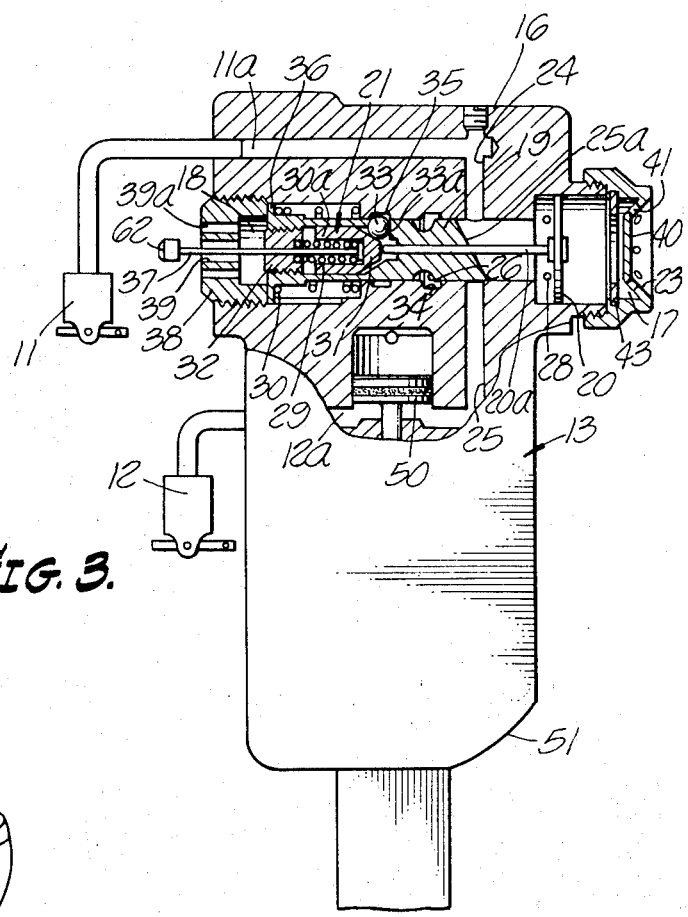
FIG. 3 is a sectional side view showing the device of FIG. 2 in an overpressure condition.
Figure 1:
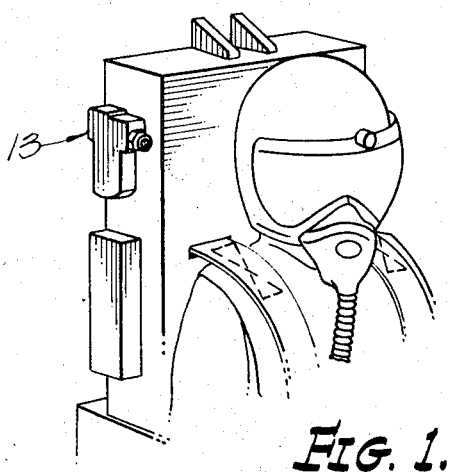
FIG. 1 is a perspective view showing the device mounted on the seat of the escape system.

The dynamic pressure actuated selector of FIGS. 1, 2 and 3 is generally designated 13. For the purpose of illustrating one important use of the selector device, it is described specifically in conjunction with an aircraft escape system which includes a first initiator 11, and a second initiator 12. However, it should be recognized that the device can be employed in several ways, completely apart from an aircraft escape system, and operated with various forms of initiators. The initiators 11 and 12 are connected in parallel and fluid, preferably gas, from each initiator can move a piston 50 which actuates a third initiator (not shown in the drawings) which after a preselected delay initiates the firing assembly 51 to cause parachute inflation. Exhaust passages 11a and 12a transmit the gas from the initiators 11 and 12, respectively. Initiators 11 and 12 actuate the third initiator after different predetermined time delays. The time delay of initiator 11 is shorter than the time delay of initiator 12. The time delay of each initiator 11 and 12 begins to run automatically from the time of ejection.

The selector 13 is connected to the first initiator 11 and either enables or disables the flow of fluid from the first initiator 11, depending on the initial air pressure at ejection. When initiator 11 is disabled, the third initiator is actuated after the predetermined time delay as set by initiator 12. When initiator 11 is not disabled, the delay in which the seat and man separator is actuated is determined by the initiator 11, it having the shorter time delay. Should initiator 11 misfire, initiator 12 is still operational and performs a back-up function thereby increasing the reliability of the escape system directly at low aircraft velocity at ejection. At high aircraft velocity at ejection, the invention increases performance reliability indirectly through the use of a time delay appropriate to the speed regime rather than a "comprising" time delay.

Since parachute inflation must take place after rocket burnout of ejection, a minimum time delay of .75 seconds for initiator 11 has been found to be desirable. The optimum time delay for initiator 12 at high speeds in order to allow for proper delay in dynamic pressure to take place, prior to parachute canopy inflation, is 2.00 seconds. The third initiator has a time delay of 1.00 seconds. Therefore, at low speeds the parachute inflation begins after 1.75 seconds and at high speeds, inflation begins after 3.00 seconds.

Selector 13 is set to react to an initial air pressure dependent on a predetermined aircraft velocity at ejection, designated the trigger velocity. In order to enhance reliability, the selector 13 is self-contained. Once the initial dynamic pressure is sensed to exceed the given level, selector 13 disables the flow of gas from initiator 11. The disabling procedure provides an either and/or time delay designation from ejection to parachute inflation, depending on whether ejection takes place below or above the reference trigger velocity. The disabling procedure, which consists of diverting the flow of gas of initiator 11 into the atmosphere, does not depend on subsequent dynamic pressure and even a complete subsequent reversal in dynamic pressure because the seat tumbling after ejection would not impede the disabling function.

The selector 13 includes a housing 16 having a small chamber 17 at one end and a release mechanism chamber 18 at the other end. Mounted for axial movement within the housing 16 is a plunger 19. A pressure plate 20 is contained within the chamber 17 and connected to one end of a stem 20a mounted for axial movement within the plunger 19. A release mechanism, generally designated 21 is contained within the release mechanism chamber 18. The other end of the stem 20a operably engages the release mechanism 21. The housing 16 is mounted on the seat parallel to the expected initial airstream with the end having the chamber 17 located upstream.

When the selector 13 first enters the airstream at ejection, the pressure plate 20 normally would sense both air momentum forces known as "airblast" and stagnation pressure. However, since only the stagnation pressure is a steady state condition which can be readily calculated, it is desirable to reduce the effect of the air momentum force to a minimum in order to achieve a predictable "trigger" setting. "Airblast" effects are reduced to a negligible order of magnitude by the baffle 23 which encloses chamber 17 at the upstream end. The airstream impacts the baffle 23 at a center plate 40 and enters the chamber 17 to communicate with the pressure plate 20 through ports 41 located at the periphery of the center plate 40. A secondary baffle or flange 43 within the baffle 23 absorbs the aerodynamic impact of the airstream entering the ports 41 and assists in reducing the velocity of the airstream. The final inward radial motion of the parted airstream causes a rapid pressure buildup in the small chamber 17. This pressure builds up to the stagnation pressure sensed by the pressure plate 20. The impact loads are transmitted from the baffle to the outer casing of the housing and thereby not sensed by the pressure plate 20. The baffle 23 also prevents tampering with the impact plate.

Another consideration which must be kept in mind when designing the selector 13 is the sensing time, i.e., the time required to fill the chamber 17 to the stagnation pressure level which the pressure plate 20 can respond to. This sensing time must be kept at a minimum in order that the time delays of the initiators 11 and 12 will not be affected. Since the distance between the pressure plate 20 and the baffle 23 is small, the sensing time will be negligible.

When the selector 13 is in an enable mode or underpressure condition as shown in FIG. 2, an inlet passage 24, an outlet passage 25 and a ring channel 26 on the plunger 19 provide for continuity of flow from the exhaust passage 11a to the piston 50. When the selector 13 is in a disable mode or overpressure condition the end of the plunger 19 is tapered at 25a in such a fashion to direct the flow of gas from inlet passage 24 into the atmosphere through openings 28 in the housing 16 behind the pressure plate 20 and at the same time prevents any flow of gas into outlet passage 25.

The release mechanism resists axial movement of the plunger when the air pressure acting on the pressure plate is below a preselected level. The release mechanism 21 includes a calibration spring 29 and a power spring 30. The calibration spring 29 is mounted coaxially within a sleeve 30a which is mounted coaxially within the plunger 19. The calibration spring 29 is further positioned between a conical wedge 31 on the upstream end of sleeve 30a and a calibration control cap 32. The calibration control cap 32 is threaded externally to mate with the internal threads within the end of the plunger 19. The calibration spring 29 exerts a force on the downstream side of the conical wedge 31 which in turn pushes outwardly on a plurality of balls 33, preferably three, mounted in circumferentially spaced openings 33a in the plunger 19. The end of the stem 20a opposite the pressure plate 20 is in contact with the upstream side of conical wedge 31. The balls 33, when the selector 13 is in the enable mode, seat in an initial annular groove 34 in the inner wall of the housing 16. When the selector 13 is in the disable mode, the balls seat in a terminal annular groove 35 in the inner wall of the housing 16. The amount of force necessary to move the balls 33 inwardly and unseat them depends on the opposing force of the calibration spring 29 which can be adjusted by turning the calibration control cap 32 in one direction or another.

The power spring 30 is mounted coaxially about the plunger 19 between a flange 36 on the end of plunger 19 and the housing 16. The power spring 30 exerts a force in the same direction as the force exerted on the pressure plate 20 by the stagnation pressure. The power spring 30 and the seating of the balls 33 in the terminal annular goove 35 prevents the plunger, once it has been disabled, from returning to the enable mode because of dynamic pressure reversal, such as might be caused by seat tumbling. A rear cap 38 having a small central opening 39 encloses the release mechanism chamber 17 in the housing 16 and prevents tampering with the release mechanism 21. Further openings 39a in the cap 38 eliminate any possible forces caused by compressing the air in the release chamber 18 which might resist the axial movement of the plunger 19. An indicator stem 37 having one end 61 anchored between the calibration spring 29 and the conical wedge 31 extends its other end 62 out the opening 39 in the cap 38 and beyond the housing 16 when the selector 13 is in a disabled condition. This extending end 62 of the initiator stem 37 can also operably engage a switch or lever to trigger another function. A portion of the flange 36 is slidably positioned within a groove 55 to prevent rotation of the plunger 19.

The operation of the device is as follows:

The selector 13 is mounted on the seat in such a manner that the airstream at ejection is parallel to the stem 20a and the plunger 19. The air first contacts the center plate 40 then enters through ports 41 and passes into chamber 17 until stagnation pressure creates a force which acts on the pressure plate 20 and is transmitted by stem 20a to the conical wedge 31 and in the same direction as the power spring 30. When the force of the stem 20a acting on the conical wedge 31 exceeds the opposing force exerted by the calibration spring 29, the calibration spring 29 is compressed and the conical wedge 31 moves axially downstream whereby the balls 33 move inwardly away from the annular groove 34. The plunger 19 is moved by the power spring 30 axially downstream until the flange 36 bottoms on the cap 38 and the balls 33 seat in the terminal groove 36. Preferably, the force necessary to unseat the balls 33 occurs when the aircraft velocity at ejection exceeds 300 knots indicated air speed, I.A.S. As the plunger 19 moves, the ring channel 26 moves out of alignment with the inlet passage 24 and outlet passage 25. When the plunger 16 has completed its movement the gas flow is diverted from the inlet passage 24 and vented into the atmosphere, via openings 28, thereby disabling the first initiator 11. The second initiator 12 then actuates the third initiator. When the air pressure acting on the pressure plate 20 is below the preselected level, the plunger 19 remains in the initial position and the ring channel 26 communicates the flow from inlet passage 24 to outlet passage 25 whereby initiator 11 actuates the third initiator.

A modification as shown in FIGS. 4 and 5 operates in a similar fashion to the preferred embodiment, but incorporates a different release mechanism and air inlet.

This modified selector, generally designated 100, is described in connection with a first initiator 111 and a second initiator 112. The initiators 111 and 112 correspond to initiators 11 and 12, respectively, as set forth above and also are connected in parallel and each initiator actuates a third initiator (not shown in the drawings) by means of fluid pressure, preferably gas. Exhaust passages 111a and 112a transmit the gas from the initiators 111 and 112, respectively. Initiators 111 and 112 actuate the third initiator after different predetermined time delays. The time delay of initiator 111 is shorter than the time delay of initiator 112.

The selector 100 is connected to the first initiator 111 and either enables or disables the flow of fluid from the first initiator 111, depending on the initial air pressure.

Check valves 114 and 115 in either side of the intersection of the exhaust passage 111a and 112a, respectively, complement the function of the actuators and prevent the individual counter-effects of one initiator on the other. These check valves 114 and 115 are not truly necessary, but are desirable in order to increase reliability of operation and lessen the line losses within the exhaust passages thereby increasing line pressure.

The selector 100 includes a cylindrical housing 116 having an expansion chamber 117 at one end and a release mechanism chamber 118 at the other end. Mounted for axial movement within the housing 116 is a plunger 119. One end of the plunger 119 has a pressure plate 120 which is contained within the expansion chamber 117. The other end of the plunger comprises a release mechanism, generally designated 121, which is contained within the release mechanism chamber 118. A relatively small inlet opening 122 in the housing 116 and opposite the pressure plate 120 passes air at ejection from the atmosphere to the expansion chamber 117 and eventually to the pressure plate 120. The cylindrical housing 116 is mounted parallel to the expected initial airstream with the inlet opening 122 at the upstream end.

When the initiator selector 100 is in an enable mode or underpressure condition as shown in FIG. 4, an inlet passage 124 and outlet passage 125 in the housing 116 and a porting channel 126 in the plunger 119, all in alignment, provide for continuity of flow in the exhaust passage 111a. Threaded collars 124a and 125a connect the inlet passage 124 and outlet passage 111a. When the initiator selector 100 is in a disable mode or overpressure condition, an exhaust channel 127 in the plunger 119 receives the flow from inlet channel 124 and vents it into the atmosphere through an opening 128 in the housing 116 and at the same time outlet passage 125 is closed by the plunger 119 to prevent the flow of any fluid from initiator 111 to the third initiator.

The release mechanism 121 includes a calibration spring 129 and a power spring 130. The calibration spring 129 is mounted coaxially within the plunger 119 between a conical wedge 131 having a sleeve portion 131a around part of the spring 129 and a calibration control cap 132. The calibration control cap 132 is threaded externally to mate with the internal threads within the end of the plunger 119. The calibration spring 129 exerts a force on the conical wedge 131 which pushes a plurality of balls 133, preferably three, mounted in openings 133a in the plunger 119, outwardly. The balls 133, when the selector 100 is in the enable mode, seat in an initial annular groove 134 in the inner wall of the housing 116 to resist axial movement of the plunger 119. When the selector 100 is in the disable mode, the balls seat in a terminal annular groove 135 in the inner wall of the housing 116. The amount of force necessary to move the balls 133 inwardly and unseat them depends on the opposing force of the calibration spring 129 which can be adjusted by turning the calibration control cap 132 in one direction or another.

The power spring 130 is mounted coaxially about the plunger 119 between a collar 136 on the end of plunger 119 and the housing 116. The power spring 130 exerts a force in the same direction as the force exerted on the pressure plate 120 by the air pressure. The power spring 130 and the seating of the balls 133 in the annular groove 135 prevents the plunger from returning to the enable mode, once it has been disabled, by a dynamic air pressure reversal, such as might be caused by seat tumbling. A rear screen 137 covers the rear opening in the housing 116 and prevents tampering with the release mechanism.

Certain design controls improve the performance of the modified selector 100. To reduce the effect of the air momentum forces which would normally act on the pressure plate 120, it has been found that the ratio of the diameter of the inlet opening 122 to the diameter of the pressure plate 120 should be a ratio of 1 to 3. A screen 123 may be placed across the inlet opening 122 to create friction with the air and insure subsonic flow within the expansion chamber 117 and also to prevent the influx of debris and the tampering of the plunger.

When designing the selector 100, the sensing time, i.e., the time required to fill the expansion chamber 117 to the stagnation pressure level which the pressure plate 20 can respond to, should be kept at a minimum in order that the time delays of the initiators 111 and 112 will not be affected. If the distance between the pressure plate 120 and the inlet opening 122 is equal to or less than three times the diameter of the pressure plate, the sensing time will be negligible.

It has been found that if the plunger is sufficiently light, i.e., less than .100 lbs., the force caused by the mass of the plunger and the acceleration of ejection and the gravitational force in the direction of the power spring force will not be detrimental. However, if the plunger exceeds .100 lbs., the combined ejection and gravitational forces could cause the plunger to move to a disable mode when the aircraft velocity at ejection is below the trigger velocity. To avoid this, the plunger can be made immune to the ejection and gravitational forces by a mass balancing technique well known to those skilled in the art, or the diameter of the pressure plate can be increased while still maintaining a relatively low plunger weight. This latter solution has been employed in a further modification as shown in FIG. 6. The diameter of the pressure plate 220 of the selector 200 has been increased such that the ratio of the distance between the pressure plate 220 and the inlet opening 222 is only 2 to 1 of the pressure plate 220. One further difference is the expansion angle behind the inlet opening 222. This angle is restricted to an angle below 15° in order to minimize flow separation. The rest of the selector 200 is essentially the same as selector 100 and will not be described in detail.

The operation of the modifications shown in FIGS. 4, 5 and 6 are as follows:

The selector is mounted on the seat in such a manner that the airstream at ejection will be parallel to the inlet opening. The air then enters the expansion chamber 117 and stagnation pressure creates a force which acts on the pressure plate and the plunger 119 in the same direction as the power spring 130. When the combined force of the stagnation pressure and power spring 130 exceed the force required to unseat the balls 133, the plunger 119 moves axially away from the inlet opening until the pressure plate bottoms on the housing 116 and the balls 133 seat in the terminal groove 136. As the plunger 119 moves, the porting channel 126 moves out of alignment with the inlet passage 124 and outlet passage 125. When the plunger 116 has completed its movement, the exhaust channel 127 diverts the gas flow from the inlet passage 124 to vent it into the atmosphere, thereby disabling the first initiator 111. The second initiator 112 then actuates the third initiator.

This device inherently senses dynamic air pressure, and distinguishes the level of the air pressure sensed to select an initiator which will generate a function best suited for the dynamic air pressure experienced. The device includes a minimum number of parts and is reliable. It is easily adaptable to a variety of systems to select alternative functions in accordance with air pressure.

Having fully described my invention, it is to be understood that I am not to be limited to the details herein set forth, but that my invention is of the full scope of the appended claims.

I claim:

1. An air pressure responsive selector to be introduced into an airstream comprising:
    a. a housing defining a chamber and having at least one opening at its upstream end;
    b. said opening to communicate air from the airstream into said chamber;
    c. a plunger mounted within said housing for movement parallel to the airstream;
    d. means responsive to air pressure caused by the air entering said chamber to cause said plunger to move axially within said housing when the air pressure exceeds a predetermined level;
    e. release means to resist movement of said plunger when the air pressure acting on said responsive means is below the predetermined level; and
    f. and selective means responsive to the movement of said plunger to make one selection when the air pressure is below the predetermined level and another selection when the air pressure is above a predetermined level.

2. The combination, as set forth in claim 1, wherein said plunger is mounted for axial movement within said housing.

3. The combination, as set forth in claim 1, wherein said responsive means includes a pressure plate located opposite said opening and within said chamber and means to transmit the force caused by air pressure acting on said pressure plate against said release means.

4. The combination, as set forth in claim 3, wherein said transmitting means is a stem positioned axially within said plunger and having one end connected to said pressure plate and the other end in contact with said release means.

5. The combination, as set forth in claim 3, wherein the diameter of said pressure plate is three times the diameter of the inlet opening in said housing.

6. The combination, as set forth in claim 3, wherein the distance from said pressure plate to said inlet opening is three times as great as the diameter of said pressure plate.

7. The combination, as set forth in claim 3, wherein a screen is mounted across said inlet opening.

8. The combination, as set forth in claim 3, wherein the angle of expansion of said chamber after said inlet opening is less than 15°.

9. The combination, as set forth in claim 3, wherein the distance between said pressure plate and said inlet opening is twice that of the diameter of said pressure plate.

10. The combination, as set forth in claim 1, wherein:
 a. said release means includes a plurality of balls mounted circumferentially on said plunger;
 b. said housing having an annular groove to seat said balls; and
 c. means within said plunger to force said balls into a seated position.

11. The combination, as set forth in claim 10, wherein:
 a. said seating means comprises a conical wedge mounted for axial movement within said plunger;
 b. a calibration cap enclosing the downstream end of said plunger; and
 c. resilient means positioned between said calibration cap and said wedge whereby said wedge is forced against said balls to move said balls outwardly.

12. The combination, set forth in claim 10, wherein three balls are used.

13. The combination, as set forth in claim 12, wherein:
 a. said plunger has a collar on its downstream end; and
 b. a spring mounted coaxially about said plunger and between said collar and said housing to provide an axial force on said plunger in the same direction as the force from air pressure on said pressure plate.

14. The combination, as set forth in claim 1, wherein:
 a. a baffle encloses said opening in said housing;
 b. said baffle having a center plate which receives the airstream impact and a plurality of ports; and
 c. said ports are located at the periphery of said center plate and communicate air from the airstream into said chamber.

15. The combination, as set forth in claim 14, wherein a secondary baffle is positioned downstream from said center plate opposite said ports.

16. The combination, as set forth in claim 1, wherein:
 a. said selective means includes a first initiator means to initiate a function by fluid flow;
 b. an inlet passage to transmit the fluid to said plunger from said first initiator;
 c. an outlet passage to transmit the fluid from said plunger to the function to be initiated;
 d. channel means on said plunger to communicate the fluid from said outlet passage to said inlet passage when the air pressure acting on said pressure plate is below the predetermined level; and
 e. means on said plunger to divert the fluid from said inlet passage away from said outlet passage when the air pressure acting on said pressure plate is above the predetermined level.

17. The combination, as set forth in claim 16, wherein at least one opening is provided within said housing to vent the diverted fluid into the atmosphere.

18. The combination, as set forth in claim 16, wherein a second initiator means initiates the function when the fluid from said first initiator means has been diverted.

19. The combination, as set forth in claim 18, wherein said second initiator means takes longer to initiate the function than said first initiator means.

20. The combination, as set forth in claim 18, wherein the time intervals it takes said first initiator means and said second initiator means to initiate the function are preselected.

21. The combination, as set forth in claim 18, wherein said first and second initiator means each include exhaust passages.

22. The combination, as set forth in claim 1, wherein an indicator stem extends from said housing when said plunger is moved.

23. An air pressure responsive selector to be introduced into an airstream comprising:
 a. a housing defining a chamber and having at least one opening at its upstream end;
 b. a plunger mounted for axial movement within said housing;
 c. a pressure plate located within said chamber;
 d. said inlet opening to transmit air into said chamber and against said pressure plate;
 e. a plurality of balls mounted circumferentially on said plunger;
 f. adjustable means within said plunger to force said balls outward from said plunger;
 g. said housing having a first annular groove to receive and seat said outwardly extended balls which resist axial movement of said plunger when the air pressure acting on said pressure plate is below a predetermined amount;
 h. a power spring mounted coaxially on said plunger to exert an axial force on said plunger in the same direction as the force acting on the pressure plate caused by the air pressure whereby said plunger is moved axially downstream by the force of the power spring when the force on the pressure plate caused by the air pressure exceeds a predetermined amount;
 i. a second annular groove to receive said balls after movement of said plunger to help prevent reverse movement of said plunger; and
 j. means on said plunger to make one selection without movement of said plunger and to make another selection when said plunger moves.

24. The combination, as set forth in claim 23, wherein a stem mounted for axial movement within said plunger and having one end connected to said pressure plate transmits the force acting on said pressure plate against said adjustable means to reduce the outward force on said balls.

25. The combination, as set forth in claim 23, wherein a baffle means is connected to said housing at said inlet opening to reduce air momentum forces acting on said pressure plate.